United States Patent
Sinha et al.

(10) Patent No.: US 7,401,084 B1
(45) Date of Patent: Jul. 15, 2008

(54) TWO-PHASE COMMIT WITH QUERYABLE CACHES

(75) Inventors: Bipul Binit Sinha, Foster City, CA (US); Amit Ganesh, San Jose, CA (US); Lakshminarayanan Chidambaran, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 435 days.

(21) Appl. No.: 09/881,505

(22) Filed: Jun. 14, 2001

(51) Int. Cl.
*G06F 17/30* (2006.01)

(52) U.S. Cl. ...................................... 707/10

(58) Field of Classification Search .............. 707/2, 707/10, 200, 201, 202, 8, 1; 714/6, 19, 4, 714/15; 709/201, 223, 226, 231, 206, 245, 709/224

See application file for complete search history.

(56) References Cited

U.S. PATENT DOCUMENTS

| | | | | |
|---|---|---|---|---|
| 4,866,714 A | * | 9/1989 | Adams et al. | 714/724 |
| 5,335,343 A | * | 8/1994 | Lampson et al. | 714/19 |
| 5,452,445 A | * | 9/1995 | Hallmark et al. | 707/2 |
| 5,917,998 A | * | 6/1999 | Cabrera et al. | 714/6 |
| 6,088,694 A | * | 7/2000 | Burns et al. | 707/8 |
| 6,538,668 B1 | * | 3/2003 | Ruberg et al. | 715/747 |
| 6,952,741 B1 | * | 10/2005 | Bartlett et al. | 709/245 |
| 2002/0120696 A1 | * | 8/2002 | Mousseau et al. | 709/206 |

* cited by examiner

*Primary Examiner*—Etienne P LeRoux
(74) *Attorney, Agent, or Firm*—Michele Liu Baillie; Gordon E. Nelson

(57) ABSTRACT

An optimization of the two-phase commit protocol employed in distributed systems. Each cohort component of the distributed system augments messages that are accessible to the coordinator component with state information indicating whether the cohort is read-only with regard to a transaction that the coordinator is coordinating. The coordinator retains the most recent state information. The coordinator reads the retained state information for the cohorts and when the transaction terminates, the coordinator reads the retained state information. Where the cohort's state is read-only, the coordinator simply sends an abort message instead of performing the full two-phase commit protocol with regard to the read-only cohort. In the trees of distributed system components that are defined by transactions, any cohort which has children in the tree is a local coordinator for its children. The general technique of cohorts augmenting messages accessible to a coordinator with state information that is relevant to an action to be performed by the coordinator and the coordinator acting in accordance with state retained from the messages has other uses as well.

6 Claims, 6 Drawing Sheets

FIG. 1—Prior Art

TWO-PHASE COMMIT WITH QUERYABLE CACHES

CROSS REFERENCES TO RELATED APPLICATIONS

The present patent application is being filed on even date with three other patent applications addressed to techniques for improving queryable caches. The present patent application is also related to U.S. Ser. No. 09/294,656, Cusson, et al., Web servers with queryable dynamic caches, filed Apr. 19, 1999 and to its PCT counterpart, PCT/US00/10516, which was published Oct. 26, 2000 as WO 00/63800. All of the related applications have a common assignee.

BACKGROUND OF THE INVENTION

1. Field of the Invention

The invention relates generally to techniques for making frequently-referenced data more available to programs using the data and more specifically to techniques for making distributed queryable caches of data that is contained in large databases. The caches are transparent to the program that is querying the large data base in that the program generally need not be altered when a cache is added.

2. Description of Related Art

Local and Remote Copies of Data

A common problem in data processing systems is that frequently-used data cannot be quickly accessed, either because there is not enough capacity in the connection between the processor and the data storage or because too many program executions are contending for access to the data storage. One way of solving the problem is to make a copy of the data and put the copy in a location where it is more accessible to some of the program executions that are using the data. Those program executions can then reference the copy of the data in the more accessible location rather than the original data. In the following, the more accessible copy will be called the local copy, while the less-accessible original will be called the remote copy. It is to be understood, of course, that the terms remote and local represent degrees of accessibility and that both copies may be physically in the same location.

The local copy may be a complete copy of the data or it may be only a partial copy; further, the local copy may or may not be transparent to the executing program. When the local copy is transparent, the executing program can refer to a data item in exactly the same fashion as it did before the local copy existed. The reference goes first to the local copy. If the data is there (this is termed a hit), the data is retrieved from the local copy. If the data is not there (this is termed a miss), the reference goes automatically to the remote copy and the data is retrieved from the remote copy. When the local copy is not transparent, the program must be changed to take into account the fact that references are made to the local copy, instead of to the remote copy. In general, local copies of remote data that are both partial and transparent to the executing program are termed caches. Transparence is a relative term. Though the executing program need in general not be modified when the cache is added, the presence of the cache may result in some differences in the program's behavior, and in some cases the differences in behavior may require modification of the program.

Whenever there are local and remote copies of data, the copies must be kept consistent with each other. This is easy only if the data never changes; if it does change, then changes in one of the copies must be propagated to others of the copies. In some cases, the local copy is read only; the programs using it cannot change it, but changes in the remote copy are propagated to the local copy. In other cases, the local copy is updateable, and when this is the case, the updates must be propagated to the remote copy. When the propagation is done depends on how consistent the copies must be. For example, if the copies can be inconsistent for a whole working day, changes need only be propagated once a day. On the other hand, if it is required that the copies are always consistent, any change must be propagated immediately.

Local and Remote Copies of Databases

Databases are organized collections of data in which sets of data items are accessed by queries. The query describes the set of data items to be accessed in terms of the database's organization. The most common kind of organization for databases is relational: the data is organized into tables with named columns and rows. Each row has a field for each of its columns. A field for a column in a row contains that row's value for the column. Values in the fields can serve to uniquely identify rows of the database and to relate rows in one table to rows in a different table. A set of data items contained in a relational database is specified in terms of rows and columns of the table the items are in and values in the row or rows that contain the items. The following Employees table offers a simple example:

| emp_id | emp_name | emp_pay |
|--------|----------|---------|
| 000001 | "Owner"  | $1,000,000 |
| ...    | ...      | ...     |
| 000999 | "Drudge" | $20,000 |

This table has three columns and a row for each employee. the emp_id field of an employee's row contains a unique identifier for the employee; the emp_name field contains the employee's name; the emp_pay field contains the employee's current pay.

Relational database systems use a language called SQL to specify data sets. An SQL request on a database describes an operation to be performed on a set of data in the database. The most common kind of request is a query, which describes an operation that reads the set of data. Other requests may modify the set of data or delete the set of data. For example, an SQL query to find out how much employee "Owner" makes might look like this:

SELECT emp_pay FROM Employees
WHERE emp_name = "Owner"

This instructs the data base system to return the value of emp_pay from the row of the table Employees in which the field Emp_name has the value "Owner". The result of the query will be "$1,000,000". A database system contains not only the data, but also a description of the manner in which the data is organized. In the following, the description will be termed a data dictionary. Elsewhere, it may be termed the data base system's metadata or its schema.

Many organizations keep huge amounts of information in large central databases. As networks have grown, so has the potential for these large databases to be bottlenecks. The bigger the network, the more users, and the greater the problems caused by contention for the data base. Moreover, the network's carrying capacity is always less than the demands being made on it. As a result, it often takes a long time to transmit the query to the database, have the database perform the query, and have the results returned to the user. The development of the World Wide Web has of course increased all of these problems enormously. The database that contains the catalog of a Web merchant is accessible to literally everyone who has a connection to the Internet, and delays in getting a response are not only unpleasant for the user, but bad for the Web merchant's business.

A common approach to solving bottlenecks caused by databases is by replicating the data base. As the name implies, a replicated data base has a copy at another location. When a set of replicated databases is set up, methods are specified for keeping the replications consistent. A replicated database may be a complete copy of the database it is a replication of, or a partial copy. In the latter case, the partial copy is termed a materialized view. A materialized view may be read only, in which case, it is kept consistent with the database it is a copy of, but cannot be updated by the user, or it may be updateable, in which case the data items in the materialized view may be updated and the updates are propagated to the database of which the materialized view is a copy. A replicated database system provided by Oracle Corporation, of Redwood Shores, Calif., USA, is described in detail in the document *Oracle 8i Replication*, available in May, 2001 at technet.oracle.com/doc/server.815/

A problem with materialized views is that they are not transparent to the application program. If the application program provides a query to the materialized view that specifies a set of data items that is not in the materialized view but is in the database the materialized view was replicated from, the query simply fails, and the application must attempt it again on the database the materialized view was replicated from. Materialized views are consequently typically used in situations where it is possible to completely predict what queries will be made from a given remote location. The database tables needed to answer those queries are included in the materialized view, and since a miss never occurs, the fact that the materialized view provides no support to an application that has experienced a miss is not a problem.

However, as networks expand and more and more people need access to databases to do their jobs or to purchase products, selecting the right materialized view becomes more and more difficult. Oracle Corporation has responded to this problem by developing the queryable database cache described in published PCT application WO 00/63800, Oracle Corporation, Web Servers with queryable dynamic caches, published 26 Oct. 2000 and claiming priority from U.S. Ser. No. 09/294, 656, Cusson, et al., Web servers with queryable dynamic caches, filed Apr. 19, 1999. The cache of WO 00/63800 is transparent. When an application program makes a query on the cache, the query goes to a data access layer, which provides the query to the cache. If the query misses, the data access layer redirects the query to a remote database. There is thus no need for the application to know anything about either the cache or the remote database.

Though the queryable cache described in WO 00/63800 does have the fundamental advantage of transparency to the application program, experience with the cache has revealed some areas where improvement is needed:

The queryable cache needs to be transparent not only to the application program, but also to the data access layer.
The queryable cache needs to handle SQL requests that reference stored procedures.
There needs to be an easy way of setting up the cache so that it has all of the copies of objects that it needs to function and also has the objects necessary to link the cache to the remote database system that it is a partial copy of.
There needs to be a way of making a user session to perform redirected operations in the remote database without requiring a password from the user to make the session.
The two-phase commit process used for transactions between distributed databases needs to be optimized for the situation where the transaction does not result in modifications to particular ones of the distributed databases.

It is an object of the invention disclosed herein to solve one or more of the foregoing problems. As will be described in more detail in the following, the problems have been solved in an implementation of the queryable cache which is based on Oracle's techniques for making replicated databases that contain materialized views.

SUMMARY OF THE INVENTION

The problem of optimizing the two-phase commit protocol is solved as follows: in general, when an action is carried out in a distributed system, a component of the distributed system that is involved in the action is a coordinator for the action and other components involved in the action are cohorts for the action. During the action, the cohorts send messages which are available to the coordinator. In the optimization, each cohort augments messages which are available to the coordinator with information which indicates relevant state of the cohort with regard to the action. The coordinator reads the messages and retains the most recent relevant state for each cohort and performs an action according to the relevant state.

When the action is a transaction and the action performed by the coordinator is performing a protocol to ensure that the results of the transaction are consistent in the cohorts, the relevant state indicates whether the transaction will modify data in the cohort and the coordinator optimizes the protocol as determined by the retained state.

When the protocol is a two-phase commit protocol, the action performed by the coordinator is sending an abort message according to the two-stage commit protocol to a cohort when the retained state for the cohort indicates that the transaction will not modify data in the cohort.

Figure 1:
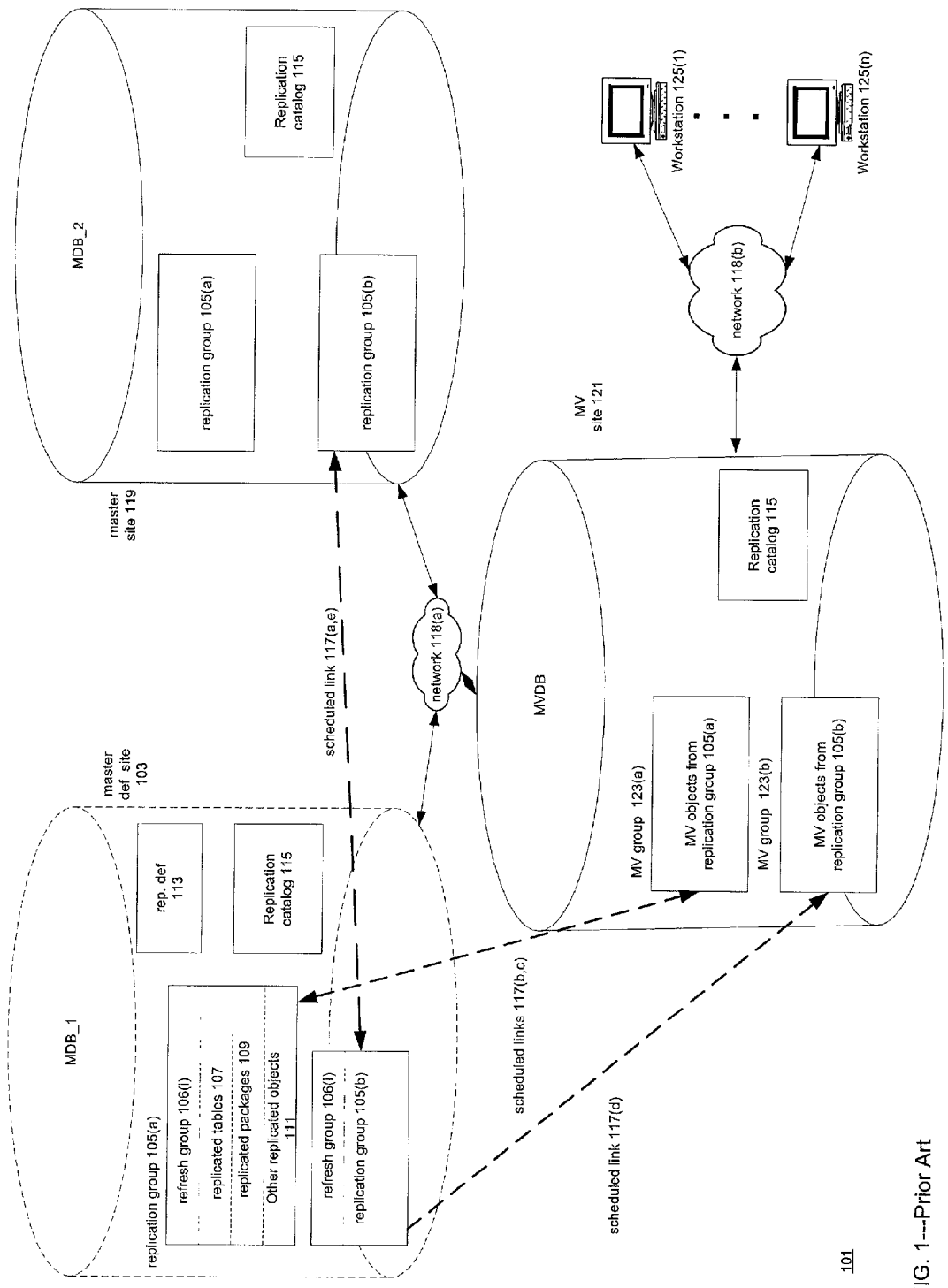
FIG. 1 is a block diagram of a prior-art distributed database system with replication.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first describe database replication as it is implemented in the Oracle 8® database system to the extent necessary to understand the invention and will then describe the invention itself.

Overview of Distributed Data Bases and Replication: FIG. 1

Distributed Databases

A distributed database is a set of databases that appear to an application program as a single database. Database objects are stored in the databases. Among database objects are database tables, packages of procedures that operate on the tables, trigger procedures that are executed in response to changes in the tables, and indexes for the tables. In the Oracle 8i database system, objects are organized into schemas associated with users of the database. The user with which a schema is associated is termed the owner of the database objects in the schema. An SQL request may reference any of the database objects in the database. When a request references a stored procedure, the database system invokes the stored procedure. FIG. 1 shows a prior-art distributed database 101. Three databases, 103, 119, and 121, contain information which is used by applications running on a workstation 125(i). The databases exchange information among themselves via network 118(a); workstation 125(i), along with a number of other workstations, has access to database 121 via network 118(b). In a typical configuration, network 118(a) may be an intranet belonging to the organization to which the three databases belong. Database 121 may be located at a server that responds to the World Wide Web protocols, network 118(b) may be the Internet, and workstation 125(i) may be executing a Web browser program. In such a configuration, the user of workstation 125(i) provides the server with information that the server uses to make an SQL request to be executed in database 121. The server then incorporates the results of the request in a Web page which it returns to workstation 125(i).

When references are made to objects in distributed database 101, the reference must specify not only the object within a database, but also the database itself. Thus, a reference to an object contained in database 103 must employ the name of that database, MDB_1, as part of the reference. References that include the name of the database that contains the object are called global references. The totality of possible global references make up the global name space of the distributed database 101.

A database that belongs to a distributed database may refer to an object in another of the databases in the distributed database by means of a link. A link is a pointer in one database to an object in another. The pointer includes the global name of the object in the other database. A reference made via a link further contains sufficient information about the source of the reference so that the database that includes the object can determine whether to grant access to the object. There are two kinds of links:

A redirection link replaces an object in one database of a distributed database system with a reference to another database of the system that contains the object. The database with the link uses the link to redirect the reference to the other database.

A scheduled link is used to keep copies of objects in different ones of the databases consistent with one another. Scheduled links will be explained in detail below.

Replication

Replication is the process of copying and maintaining database objects in multiple databases that make up a distributed database system. The objects that are copied and maintained are termed replicated objects. When a replicated object is modified in one of the databases, the modification is captured and stored locally before being forwarded and applied at each of the other databases. Systems 103, 119, and 121 contain replicated objects and are termed replication sites. There are two basic kinds of replication: multimaster replication and materialized view replication. Replication may further be done synchronously, i.e., modifications are propagated to the other replication sites substantially when they are made, or asynchronously, i.e., the modifications are propagated at some later time.

Multimaster replication is done in database systems that are master replication sites. There are two such sites in FIG. 1, site 103 and site 119. Each of these master replication sites contains copies of all of the database objects in two replication groups 105(a) and 105(b). The objects in the replicated groups are the replicated objects in the database. In each database system, replication catalog 115 specifies the replicated objects and the groups they belong to. Included in replication catalog 115 are scheduled links 117 between the replicated objects in the replication groups. Double-ended arrows indicate a link in each direction. The scheduled links define how updates are propagated between the replicated objects so that the objects belonging to the replication groups in the master replication sites remain consistent. When the link specifies a synchronous update, the update is propagated as soon as it is made; when the link specifies an asynchronous update, the updates are propagated in batches. Database system 103 is further a master definition site, which serves as a control point for replication in all three of the database systems of system 101. Replication definition 113 contains the information which master definition site 103 needs to control replication in system 101.

Materialized view site 121 differs from master sites 103 and 119 in that it contains materialized view groups instead of replication groups. A materialized view group may contain fewer than all of the objects in a replication group 105. In addition, a table in a materialized view group may contain less than all of the data in the corresponding object in the master site or may include material from several tables in the master site. Such tables are generally termed views. In many cases, there is no actual table in the database system corresponding to a view; when a query specifies a view, the data specified by the query on the view is simply retrieved from the tables upon which the view is defined. A table that actually exists in the database system is termed a base table. There are situations in which an independent table corresponding to a view is produced and included in the database. Such tables are termed materialized views. Materialized view site 121 is so called because its database stands in the same relationship to the database in its master site 103 as a view stands to its base tables and because tables corresponding to the views on base tables in master site 103 that are included in site 121 really exist in site 121.

Thus, materialized view group 123(a) contains objects from replication group 105(a), while materialized view group 123(b) contains objects from replication group 105(b). An object that belongs to a materialized view group is termed herein a materialized view object. Materialized view objects may be read-only or they may be updateable. In the former case, changes made in an object in a master site that corresponds to an object in a materialized view group are propagated to the materialized view group, but no changes can be made in an object in the materialized view group by an SQL request directed to the materialized view group.

When a materialized view object is updateable, changes made in the materialized view object are propagated to the corresponding object in the replication group corresponding to the materialized view group, and if there are other master sites, to the corresponding objects in the replication groups in those sites. Propagation of changes made in the materialized view object is as described generally for master sites. Propagation of changes from the master site to the materialized view are always done in batch mode. A given propagation of changes from the master site to the materialized view is termed a refresh of the materialized view. Refresh groups 106 for the materialized view may be specified in replication catalog 115. A refresh group may include objects from more than one replication group, as shown by refresh group 106(*i*) in master site 103. Refreshing is done by materialized view. There are two kinds of refresh:

a complete refresh refreshes all of the data in a materialized view at once.

a fast refresh merely refreshes all of the data in the materialized view which has changed since the last refresh.

The Oracle 8i system can be set to automatically perform a complete refresh when a fast refresh fails. Such a complete refresh is called a force refresh.

A major problem for the database administrator who is in charge of a distributed data base system that includes a materialized view is making sure that the materialized view database contains copies of all of the database objects that are referred to by the application programs using the materialized view. For example, if the application program calls a stored procedure and the stored procedure is not in the materialized view database, the call will fail. In order to properly design a materialized view database, the database administrator must not only understand the relationships between the tables that are being replicated in the materialized view, but also understand how these tables are queried by the application programs and what other objects the application program requires. Once the database administrator has obtained a correct design, the administrator can make a template that specifies the database objects that are required for the materialized view database and the materialized view database can use the template to copy the required objects from its master database.

A system like system 101 may of course have any number of master sites and a master site may have any number of replication groups. There may also be any number of materialized view sites 121, but each materialized view site 121 must obtain its materialized view objects from a particular one of the master sites. Other embodiments may permit materialized view sites 101 to have materialized view objects from replication groups in more than one master site.

Figure 2:
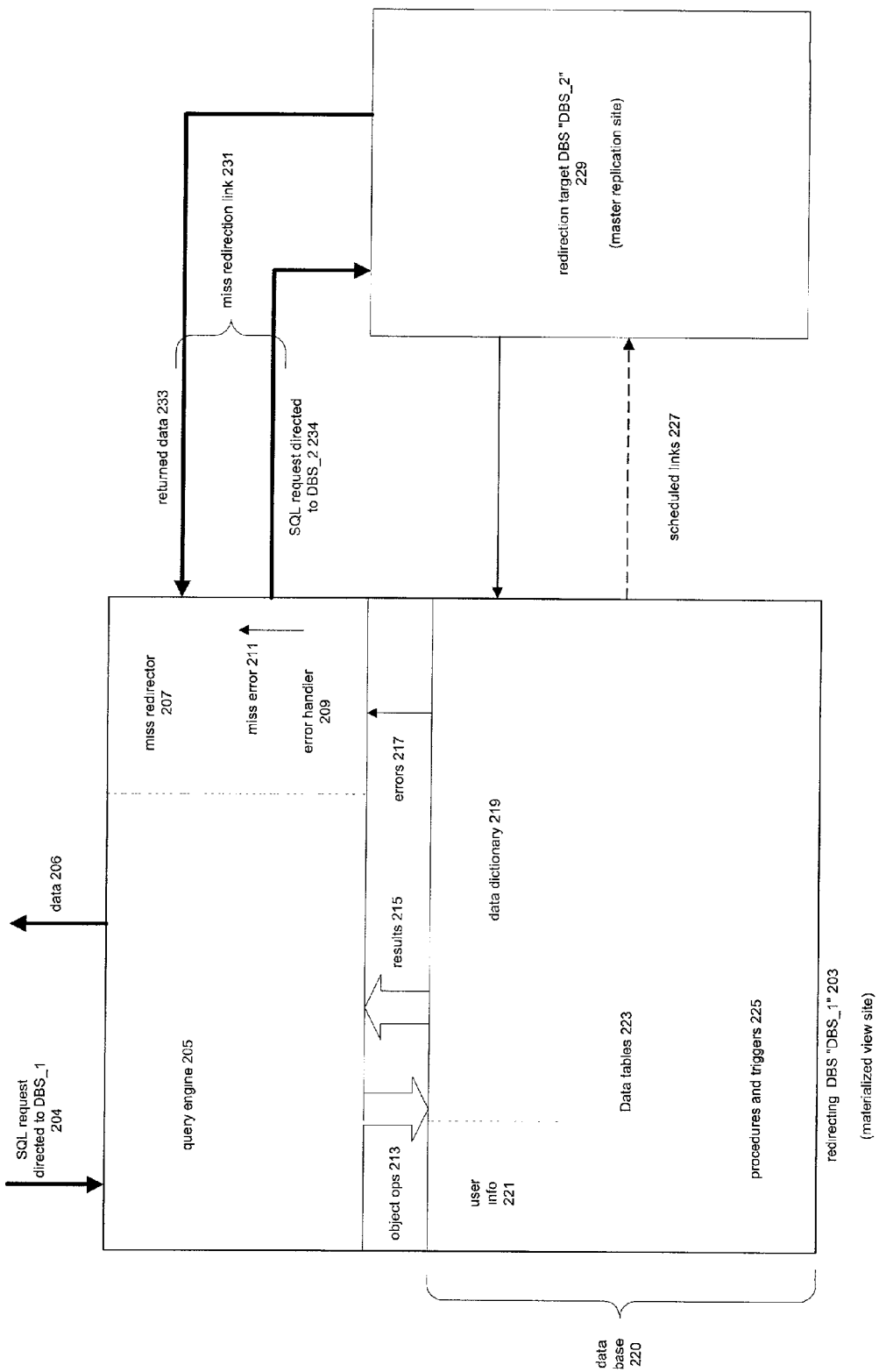
FIG. 2 is a block diagram of a distributed database system with replication in which a first database in the system that does not have a database object referred to in a statement to which the first database responds redirects the statement to a second database in the system.

Modifying a Distributed Database System with a Materialized View Site so that the Materialized View Site can Function as a Queryable Cache: FIG. 2

A materialized view site is like a queryable cache in that it responds to SQL requests and moves a subset of the database objects contained in a master site closer to the consumer of the data. It is unlike a queryable cache in that it is not transparent; when a data object is missing in the materialized view site but present in the master site, a SQL request that refers to the data object simply fails, rather than being automatically redirected to the master site. FIG. 2 shows how a distributed database system with a materialized view site can be modified to make the materialized view site function as a queryable cache.

Database system 201 in FIG. 2 includes a redirecting database system 203 which is a modified materialized view site and a redirection target database system 229 which is a master site for redirecting database system 203. Redirecting database system 203 has the global name DBS_1 and redirection target database system 229 has the global name DBS_2. At the highest level, database system 201 operates as follows:

1. Database system 203 receives an SQL request 204;
2. Database system 203 attempts to execute the SQL request; as part of executing the SQL request, database system 203 parses the request. As part of parsing the request, database system 203 resolves references in the request to database objects; if all of the references can be resolved, the request can be executed in database system 203 and database system 203 executes the request and returns the data 206 resulting from the execution to the source of the SQL request;
3. If any of the references cannot be resolved or parsing fails for other reasons, for example, if the user does not have the appropriate privileges on an object, a miss has occurred and database system 203 redirects part or all of the SQL request to database system 229, as shown by arrow 231;
4. Database system 229 executes the redirected portion of the SQL request and returns the results to database system 203 (arrow 233), which integrates it with any part of the results obtained in database system 203 and returns the complete results 206 to the source of SQL request 204.

Database system 201 differs from the system disclosed in WO 00/63800, Cusson, et al., Web servers with queryable dynamic caches, in that the redirection is done within database system 203, not in the data access layer. It should further be pointed out here that the techniques of database system 201 only require that all of the references in the request received in database system 203 be resolvable in one or another of a set of database systems that either themselves redirect SQL requests or are reachable by redirection from database systems that do, with all of the databases in the set being reachable either directly or indirectly by a redirection that begins from database system 203.

Continuing in more detail with database system 203, like all database systems, database system 203 includes a query engine 205 and a database 220. Query engine 205 resolves the references in SQL requests and performs the operations specified for the references on the objects specified by the references, as indicated by arrows 213 and 215. Database 220 has two main components: tables 223 and procedures and triggers 225. The procedures and triggers are stored programs that are executable by query engine 205. A procedure is executed when an SQL request includes a reference to the procedure; triggers are associated with other database objects and are executed when a condition under which the trigger is to be executed arises with regard to an object with which the trigger is associated. The tables include data dictionary 219, user information 221, and user tables 223. As its name implies, data dictionary 219 is a set of tables that describes all of the objects in the database system. User information 221 is tables that contain information about users of the system.

As with a standard materialized view site, database system 203 is connected by scheduled links 227 to redirection target database system 229. If database system 203 contains only read-only objects, then the only scheduled link needed is one (solid line) that provides for any necessary propagation of changes in database system 229's objects that have copies in database system 203 to database system 203. If database system 203 contains updateable objects, then there is a scheduled link (dashed line) that provides for propagation of the updates of these objects to database system 229.

Database system 203 has been modified from a standard materialized view site to enable redirection as follows:

a miss redirection link 231 has been established between database system 203 and database system 209;

code for a miss redirector 207 has been added to query engine 205.

Continuing in more detail with miss redirection link 231, miss redirection link 231 is a generalized mechanism for transferring an SQL request or a portion thereof from one database system to another. It therefore does not connect a representation of an object in one database to the object itself in another, but rather one database to another. Because it is a generalized mechanism, it can be used to transfer an SQL request when there is a miss. The redirection links used in distributed database system 101, by contrast, simply permit a reference in an SQL request to be resolved not to the data itself, but rather to a specification of another database where the data may be found. Because this is the case, a miss will not occur where there is a standard redirection link and consequently, standard redirection links cannot be used to deal with misses.

With regard to miss redirector 207, an error handler 209 is a standard component of database systems. When an error occurs while the database system is dealing with an SQL request, for example, the request contains a reference to an object that is not in the database system, the database system produces an error message that identifies the error. Error handler 209 handles the error, generally by examining the error message and invoking a function that deals with the error. In database system 203, the function that handles errors resulting from misses is miss redirector 207, which takes either the entire SQL request or the portion of the request that caused the miss and redirects it via miss redirection link 231 to redirection target database 229, as shown at 234. When the result of the redirected request or portion is returned via link 231, as shown at 233, miss redirector 207 provides the result to query engine 205 for inclusion with whatever results were obtained locally. In a preferred embodiment, the database system employs an exception handling mechanism: an exception handler is defined for a particular set of errors and when an error occurs, the query engine raises an exception that specifies the error and invokes the exception handler; in the preferred embodiment, if the error is a miss, the exception handler then invokes miss redirector 207.

Optimization of Two-Phase Commit

Figure 3:
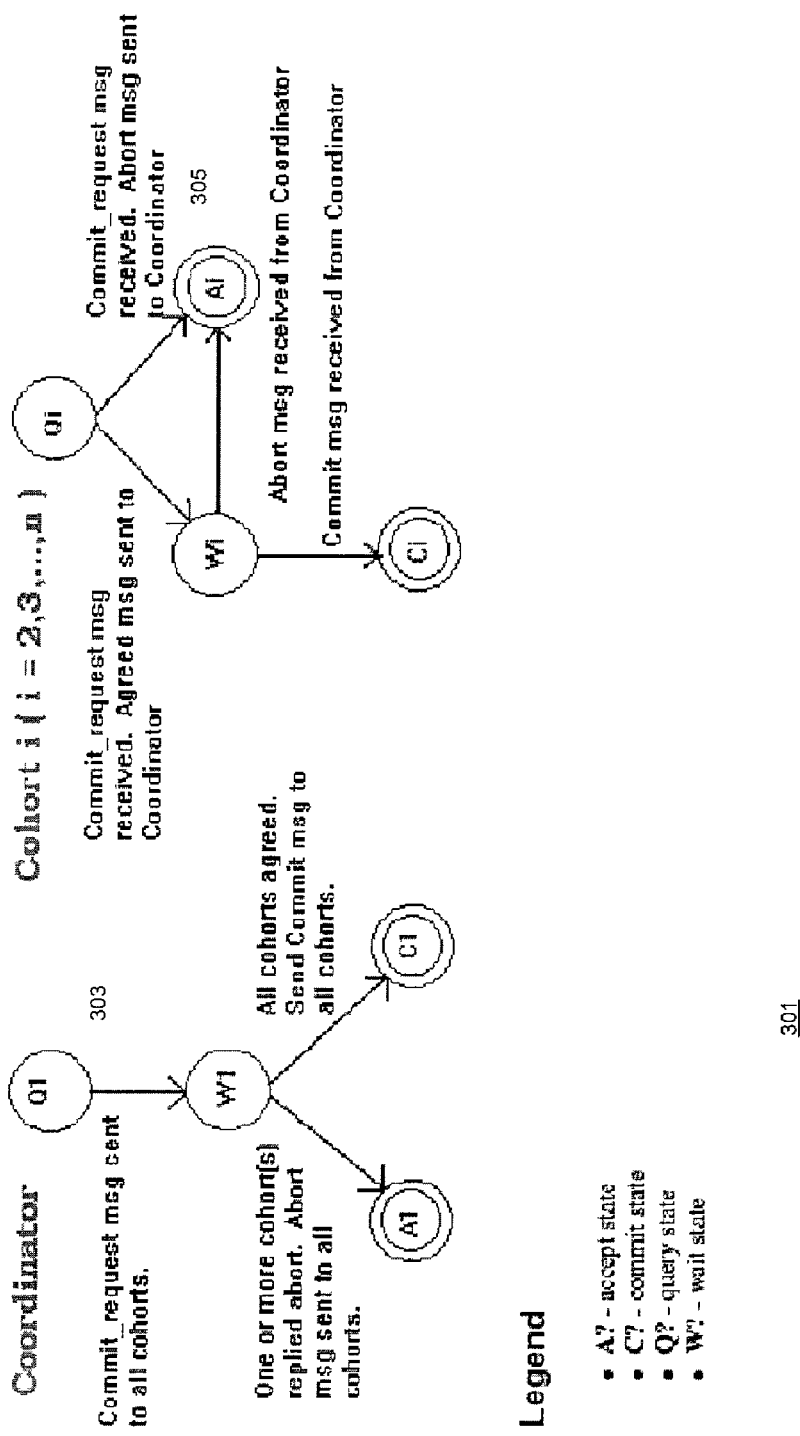
FIG. 3 shows state diagrams for a prior-art 2-phase commit protocol.

Two-Phase Commit: FIG. 3

A problem in any distributed system with replicated information is making sure that the replicated information in each part of the distributed system is consistent with the replicated information in the other parts of the distributed system. In order for there to be complete consistency, the distributed system must guarantee that a change made in any copy of the replicated information will be made in all copies. As part of this guarantee, the distributed system must also guarantee that if the change cannot be made in one of the copies, it will not be made in any of the copies.

A common way of implementing the above guarantee is by defining a sequence of one or more SQL requests as a transaction and then applying a two-phase commit protocol to the transaction to ensure that all of the requests in the sequence either execute successfully in all of the databases in the distributed system or they execute successfully in none of the databases in the distributed system. In a preferred embodiment, the end of the sequence of SQL requests making up a transaction is explicitly marked by a COMMIT or ROLLBACK PL/SQL statement, implicitly by an SQL statement that changes the definition of the database system (a DDL statement), or by termination of the session which is performing the transaction. In the following, each of these ways of marking the end of a transaction will be called a termination of the transaction. In all of these cases but ROLLBACK, the two-phase commit protocol is executed as part of the statement or action that terminates the transaction.

In the database context, the two-phase commit protocol works like this: one of the distributed databases is the coordinator for the database transaction for which the protocol is being used; the other distributed databases are the cohorts. It should be noted here that coordinator and cohort need not be fixed roles. In many cases, the database at which a transaction is initiated will be the coordinator for that transaction and the rest of the databases will be the cohorts for the transaction. The coordinator and all of the cohorts have redo logs; whenever the database system receives a statement which modifies the database, it is written to the database system's redo log. The statement itself is executed on a temporary copy of the database object involved. Additionally, each database system has a commit log in which it records the state of the two-phase commit for the transaction. Phase one begins when something occurs in the coordinator which marks the end of the transaction. In response to the end of the transaction, the coordinator sends a commit request message for the transaction. Each cohort then reads the redo log for the transaction and determines whether it can perform the transaction. If the cohort can, it sends an agree message to the coordinator; if the cohort cannot perform the transaction, it sends an abort message to the coordinator. Each of the database systems also marks its commit log to indicate the state of the commit operation.

In phase 2, if the coordinator receives agree messages from all of the cohorts, it writes a transaction committed record to its commit log and sends a commit message to each of the cohorts. Each cohort responds to the commit message by completing the transaction (for example, by writing the changes in the buffer to the database), writing a transaction committed record to its commit log, and sending an acknowledgement message to the coordinator. When the coordinator has received acknowledgement messages from all of the cohorts, it writes a transaction completed record in its transaction log.

If the coordinator receives an abort message from any of the cohorts, the coordinator sends an abort message to all of the cohorts. The coordinator then uses the information for the transaction in the redo log to undo the transaction. When each cohort receives the abort message, it, too, uses its redo log to undo the transaction. If the coordinator wishes to retry the transaction, it can use the information in the redo log to begin phase 1 again.

FIG. 3 is a state diagram 301 for the states 303 entered by the coordinator and the states 305 entered by the cohorts during the two-phase commit protocol. The diagram is taken from a discussion of the two-phase commit protocol which could be found in May, 2001 at ei.cs.vt.edu/~cs5204/fall99/index.html Optimizing Two-Phase Commit when a Transaction does not Affect a Database's State If a transaction does not affect a database's state, there is no need to do the second phase of the two-phase commit protocol with regard to the database whose state is not affected by the transaction. Hereinafter, any transaction which does not affect a database will be termed read only with regard to that database. An example of such a transaction is a read operation which redirecting database 203 has redirected to redirection target database 229. Redirecting database 203 is the coordinator here and redirection target database 229 the cohort. In the Oracle 8® database system, the two-phase commit protocol is optimized when at least some of the database systems are read-only with regard to the transaction by having the read-only databases respond to the request commit message with a read only message instead of the agree message. When the coordinator has received a read only message from a database system, the coordinator does not send the commit message to that database system.

Figure 4:
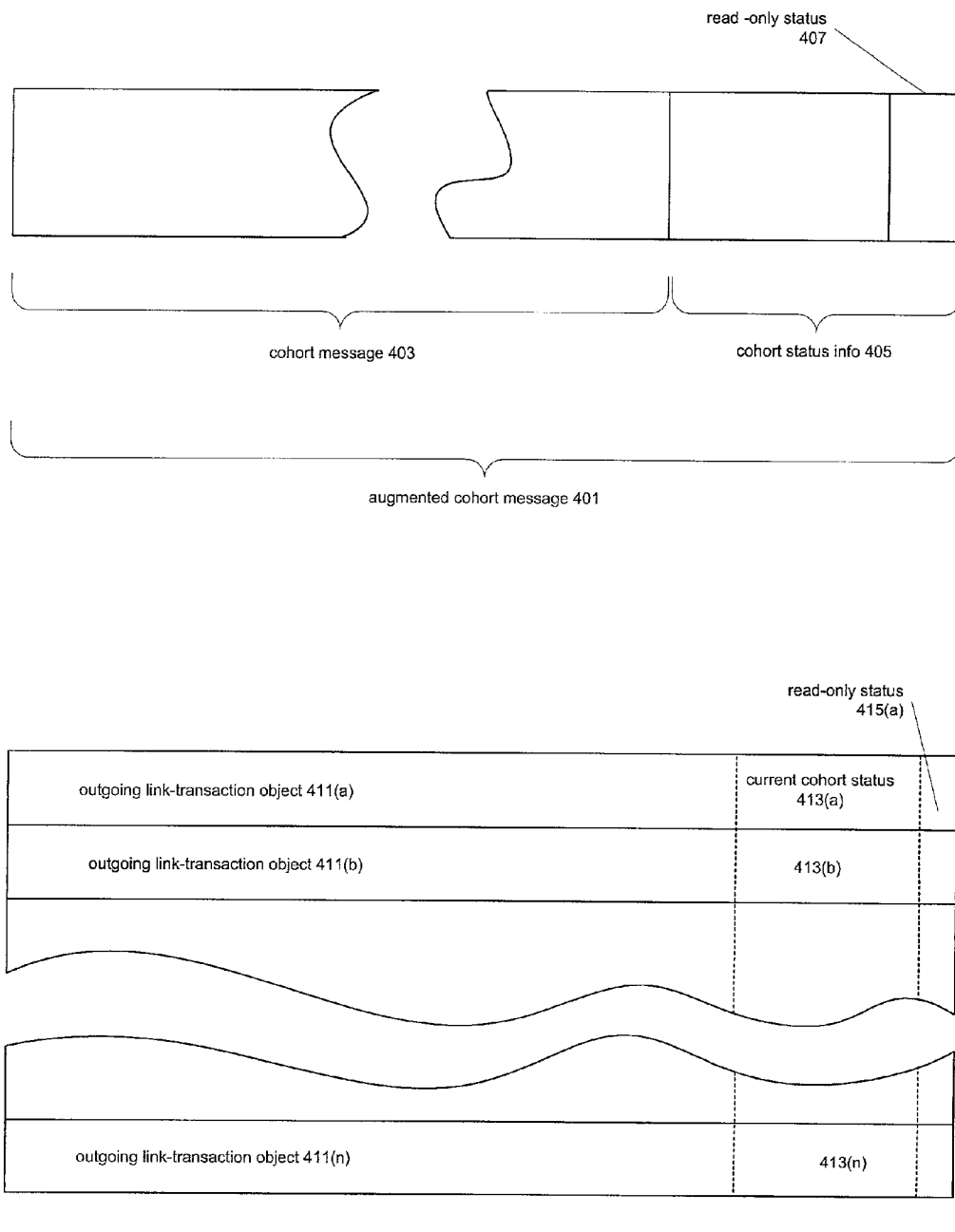
FIG. 4 shows data structures used in a preferred embodiment of the optimized 2-phase commit protocol.

Improving the Optimization: FIG. 4

In systems with database caches such as system 201, most of the transactions on cache 203 are read operations. Thus, substantial savings in system resources are possible if the coordinator knows at the end of a transaction whether it is necessary at all to perform the two-phase commit protocol.

A mechanism which ensures that the coordinator always knows whether a transaction is read-only with respect to a cohort is shown in FIG. 4. The mechanism takes advantage of two facts:

During the course of the transaction, the cohorts return messages about the transaction to the coordinator; and in databases that have outgoing links to other databases, there is a table in data dictionary which contains an object for each transaction that is currently using an outgoing link.

The mechanism's components are the following:

cohort status information which is added to each message which the cohort returns to the coordinator; and current cohort status which has been added to the object for each outgoing link.

They are shown in FIG. 4. Cohort messages 403 from the cohort to the coordinator now have an extra 32-bit word which contains cohort status information 405. One bit of that information, shown at 407, indicates whether the cohort is read-only at the time the message is sent with regard to the transaction that the message belongs to. Whenever the cohort sends a message to the coordinator, it sets bit 407 as required for the transaction the message belongs to. As each message arrives in the coordinator, the coordinator reads bit 407.

Outgoing link table 409 contains an object 411 for each combination of current transaction and outgoing link. Included in object 411 is current cohort status 413 for the link-transaction combination. Whenever the coordinator receives a message 403 from the cohort, it sets current cohort status 413 in the link-transaction object for the cohort from cohort status information 405 from the message. Included in cohort status information 413 is a copy 415 of read-only status bit 407 for that transaction. Read-only status bit 407($i$) for outgoing link-transaction object 411($i$) for the cohort's link thus indicates the read-only status of the cohort as of the last message 403 for the transaction sent by the cohort. Since the cohort status is per-transaction, the coordinator sets cohort status information 413 on beginning a new transaction to read-only.

A distributed transaction defines a tree of the database systems that are participating in the transaction. The coordinator is the root of the tree, but cohorts may be roots of subtrees. When a cohort is a root of a subtree, it is termed a local coordinator. As such, it not only responds to messages itself, but also passes them between the cohorts that are its children in the tree and its parent in the tree. Additionally, the cohort maintains its own outgoing link table as described above for each of its child cohorts. In setting bit 407, the cohort consults read only status bit 415 for each of the child cohorts and does not set bit 407 to read only unless the cohort itself and all of its child cohorts are in the read only state.

OPERATION OF THE INVENTION

FIG. 5

Figure 5:
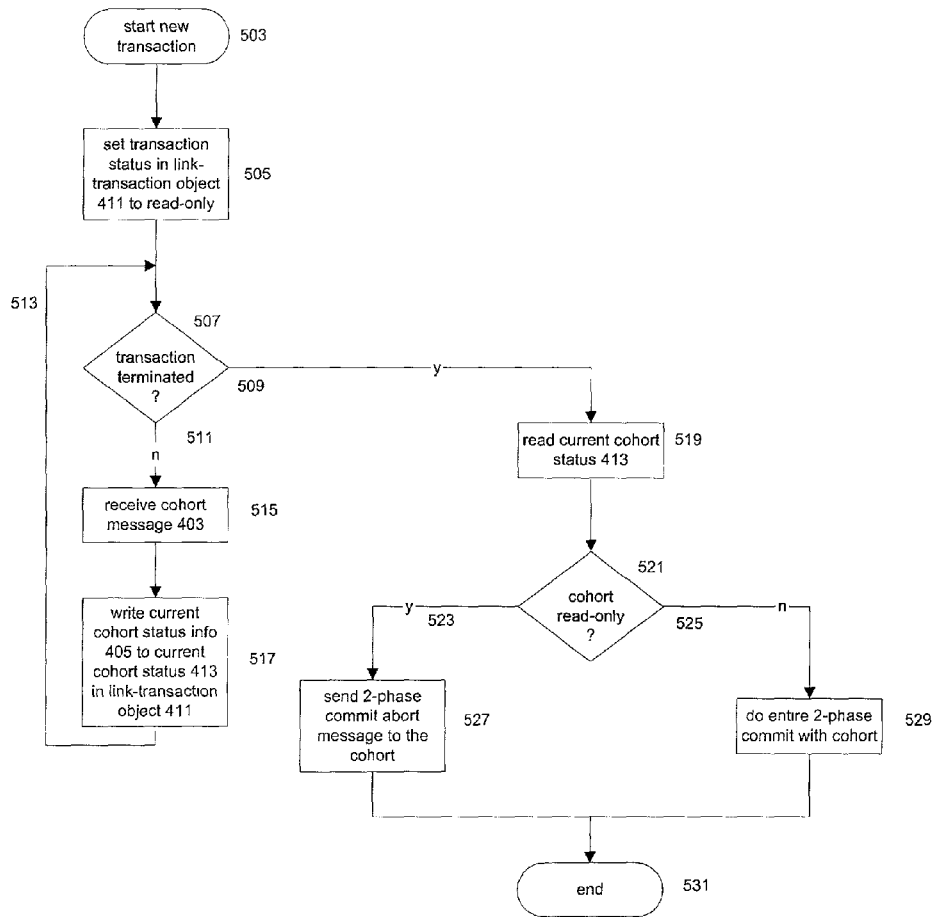
FIG. 5 is a flowchart of the optimized 2-phase commit protocol in the coordinator.
Figure 6:
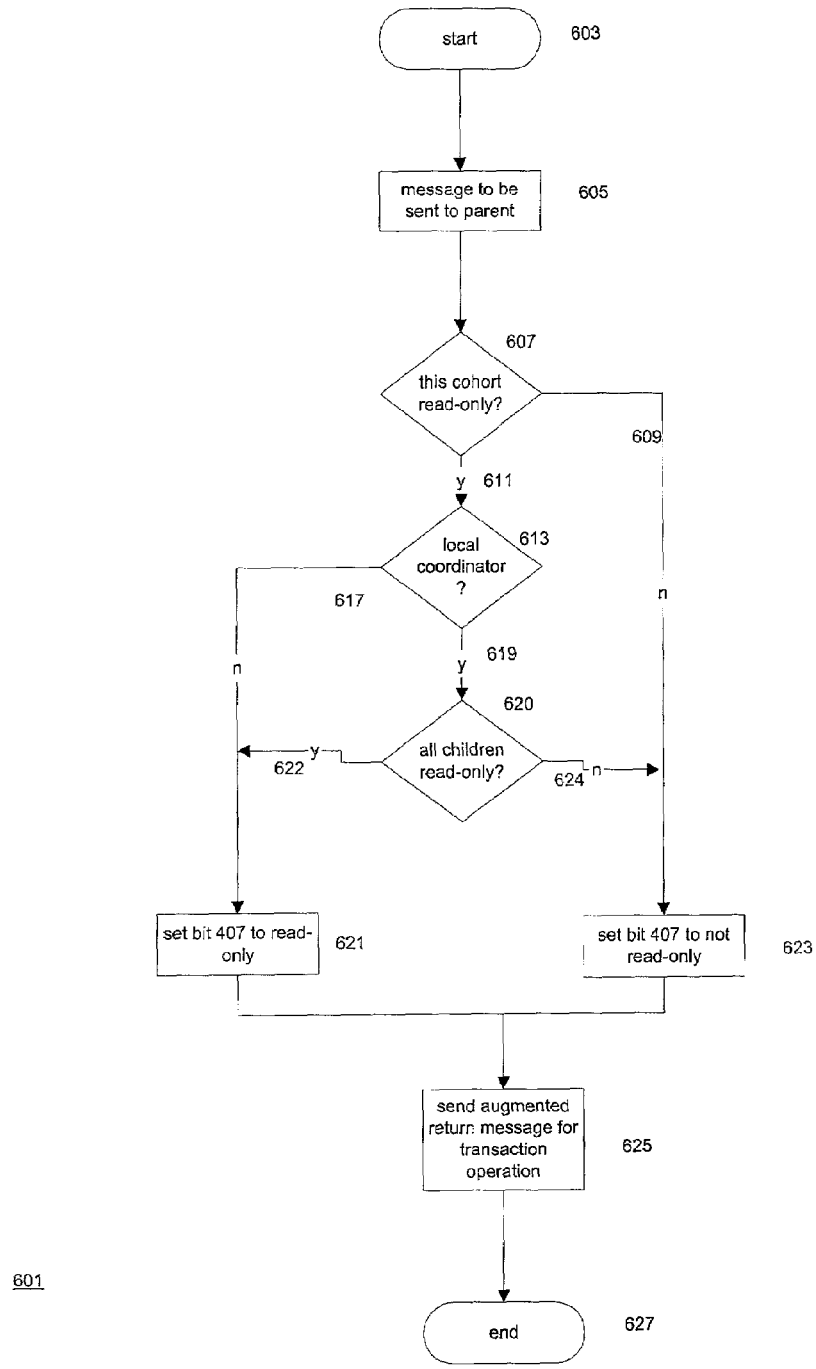
FIG. 6 is a flowchart of setting the read-only status in a cohort.

FIG. 5 shows how a preferred embodiment of the invention operates in the coordinator; FIG. 6 shows how it operates in a cohort. It should be noted here that the only difference between what the cohort does in the unoptimized protocol and what it does in the optimized protocol is that it augments the messages it sends to the application program with the read-only status information 407. Flowchart 501 begins with the start of a new transaction (503); at 505, the coordinator sets transaction status information 413 to read-only. Then the coordinator executes loop 513 until an event occurs which terminates the transaction (507). In loop 513, the coordinator receives each cohort message 403 in turn (515); on receiving the message, it writes current cohort status info 405 to current cohort status 413 in the outgoing link-transaction object for the cohort and transaction. Current cohort status 413 for a link-transaction object thus always contains the most recent read-only state of the cohort.

When the transaction terminates, the coordinator does the following for each cohort for which the coordinator has a link-transaction object 411: it reads the current value of read-only status 415 in the cohort's link-transaction object (519); if the current cohort status in the cohort's link transaction object 411 indicates that the current cohort status is read only (521), the coordinator sends the cohort the abort message from the 2-phase commit protocol (527); if the current cohort status for the cohort is not read only, the coordinator does the entire two-phase commit with the cohort (529).

FIG. 6 is a flowchart 601 showing how a cohort sets read-only status bit 407 in the messages it sends to its parent in the transaction tree. When the cohort is to send a message to its parent, (605), the cohort checks information in the database system to determine whether the cohort is in the read-only state with regard to the transaction. If it is not (607), it sets bit 407 to indicate that it is not in the read-only state. If the cohort has children in the transaction tree, it is a local coordinator. If that is not the case (613) and the cohort is read only, the cohort sets bit 407 to indicate that it is not in the read only state (621). If the read-only cohort is also a local coordinator and the outgoing link-transaction objects for the children indicate that they are all read only (620), the cohort sets bit 407 to read only (621); otherwise, it sets bit 407 to not read only (623). The message being sent is augmented with bit 407 and sent to the cohort's parent.

In the optimization, the coordinator sends abort messages belonging to the two-phase commit protocol to the cohorts in two circumstances: when the coordinator desires to abort the transaction, as in the standard two-phase commit protocol, and when the read-only status 415 for a cohort indicates that the cohort is read only. Because the read-only status for a cohort cannot be read only unless the subtrees of which the cohort is a parent are read only, a cohort that is a local coordinator can react to the abort message in either circumstance in the same way: by sending abort messages to its children. If the children are local coordinators, they do the same with their children, and so on to the leaves of the tree.

For the other messages of the two-phase commit protocol, the local coordinators act in the same fashion as shown in FIG. 5 for the coordinator for the transaction: the messages are sent only if the child's status is not read only.

As can be seen from the foregoing, the optimization replaces the messages of the two-phase commit protocol with the single abort message when a cohort and any subtree of which it is the root is read only; moreover, the optimization eliminates for read-only subtrees the bookkeeping which the coordinator and local coordinators would otherwise do for them in the course of the commit protocol and further eliminates the bookkeeping for the two-phase commit protocol done in read-only cohorts by the cohorts themselves. When the cohorts have high percentages of read-only data, as is typical of caches, the two-phase commit protocol can often be reduced to an abort message sent to the cohort.

Generalizations

The Cache as Cohort

The use of the foregoing technique for optimizing two-phase commit with operations that do not change the state of the cohort is not limited to situations where the coordinator is a database cache and the cohort is a database from which the objects in the cache have been copied. For example, a cache such as database 203 is a member of a distributed database system that employs replication; consequently, if a transaction is performed on replicated data in another of the database systems in the distributed database system, the database system which first receives the transaction is the coordinator and the other database systems in the distributed system, including database 203, are cohorts.

An example of a transaction where database 203 is a cohort and the optimization is beneficial is the following: Database 203 contains a subset of the objects in the master databases of the distributed system, and thus, it can happen that an update transaction on a master database involves an object that is not contained in database 203. When the transaction is propagated to database 203, it will fail because the object is not contained in database 203. However, the failure of the transaction will not affect the state of database 203, and thus database 203 will send an augmented message that indicates that database 203 is read-only with respect to the update. The remainder of the protocol will then work exactly as described above.

Other Applications of the Optimization

While the preferred embodiment employs the optimization for transactions which are read-only with respect to one or more cohort databases, the technique is general and can be used in distributed systems whenever it would be useful for one component of a distributed system to have additional information about the state of other components of the system. With protocols for transactions, the optimization technique can be used in any situation where the protocol can be optimized if global or local coordinators for the transaction have current knowledge during the transaction of state in the cohorts that is relevant to the optimization. The only requirements for the optimization are that the messages sent from the cohorts in the course of the transaction are augmented with information concerning the relevant state and that the relevant state is available to the coordinator while the coordinator is performing the transaction. Of course, several different optimizations may be possible, and a given augmented message may contain relevant state for a number of optimizations.

CONCLUSION

The foregoing detailed description has shown those skilled in the relevant technologies how performance of actions in a distributed system may be optimized and how to use such optimizations. Applicants have further shown how their invention may be used to optimize the two-phase commit protocol and have shown the best mode presently known to them of employing their invention to optimize the two-phase commit protocol. The principle of the invention can be used in other protocols for ensuring that a transaction in a distributed database system has consistent results in all of the participating components of the distributed system and can be used generally whenever a coordinator component of a distributed system and cohort components of the system cooperate to perform an action and the coordinator component can optimize an action based on knowledge of the current state of the cohort systems.

It should further be pointed out here that the terms used to describe the participants in the action and/or protocol messages are shorthand for functions. Thus, any component of a distributed system that coordinates an action should be thought of as a coordinator, and the components coordinated by the coordinator for the action should be thought of as cohorts. Similarly, any protocol message that performs the function of what is termed an abort message herein should be thought of as an abort message.

For all of the foregoing reasons, equivalents to the structures and methods disclosed in the Detailed Description are intended to include not only equivalent structures and methods in other database systems, but equivalent structures and methods in distributed systems generally. Further, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of executing a two-phase commit protocol for a transaction, the transaction involving a coordinator and a cohort and the method comprising the steps performed in the coordinator of:

prior to termination of the transaction, receiving a message of the transaction from the cohort, the message being augmented with state information indicating whether the transaction modifies the cohort's data;

retaining the state information for the cohort;

when the transaction terminates, reading the state information for the cohort; and if the state information for the cohort indicates that the transaction does not modify the cohort's data, sending an abort message of the two-phase commit protocol to the cohort without sending a commit request message of the two-phase commit protocol.

2. A data storage device, characterized in that:

the data storage device contains code which, when executed by a processor, performs the method of claim 1.

3. A method of executing a two-phase commit protocol for a transaction, the transaction involving a coordinator and a cohort and the method comprising the steps performed in the cohort of:

prior to termination of the transaction, augmenting a message that the cohort sends to the coordinator as part of the transaction with state information indicating that the transaction will not modify the cohort; and when the transaction terminates, receiving an abort message from the coordinator as required by the two-phase commit protocol without receiving a commit request message of the two-phase commit protocol.

4. A data storage device, characterized in that:

the data storage device contains code which, when executed by a processor, performs the method of claim 3.

5. A coordinator in a distributed system that coordinates a two-phase commit protocol employed with a transaction that involves one or more cohorts in the distributed system, the coordinator having the improvement comprising:

retained state information that retains state of a cohort, the state indicating whether the transaction will modify the cohort's data, the coordinator receiving prior to termination of the transaction a message of the transaction from the cohort which has been augmented with the state information, retaining the state information from the augmented message in the retained state information, and when the transaction terminates, reading the retained state information for the cohort, and if the retained state information for the cohort indicates that the transaction does not modify the cohort's data, sending an abort message of the two-phase commit protocol to the cohort without sending a commit request message of the two-phase commit protocol.

6. A cohort in a distributed system in which a coordinator in the distributed system coordinates a two-phase commit protocol employed with a transaction that involves the cohort, the cohort having the improvement comprising:
　　a message of the transaction that is augmented with state information indicating that the transaction will not modify the cohort's data,
　　the cohort sending the message to the coordinator prior to termination of the transaction and the coordinator retaining the state information, and
　　when the transaction terminates, receiving an abort message of the two-phase commit protocol from the coordinator without receiving a commit request message of the two-phase commit protocol.

* * * * *

UNITED STATES PATENT AND TRADEMARK OFFICE
CERTIFICATE OF CORRECTION

| | | |
|---|---|---|
| PATENT NO. | : 7,401,084 B1 | Page 1 of 1 |
| APPLICATION NO. | : 09/881505 | |
| DATED | : July 15, 2008 | |
| INVENTOR(S) | : Sinha et al. | |

It is certified that error appears in the above-identified patent and that said Letters Patent is hereby corrected as shown below:

On sheet 4 of 6, in Figure 4, line 1, delete "read -only" and insert -- read-only --, therefor.

In column 2, line 37, delete "the" and insert -- The --, therefor.

In column 2, line 53, delete "Emp_name" and insert -- emp_name --, therefor.

In column 2, line 23, after "815/" insert -- . --.

In column 4, line 40, below "cohort." insert -- Other objects and advantages will be apparent to those skilled in the arts to which the invention pertains upon perusal of the following Detailed Description and drawing, wherein: --.

In column 4, line 65, delete "8®" and insert -- 8i® --, therefor.

In column 5, line 1, delete "Data Bases" and insert -- Databases --, therefor.

In column 10, line 47, after "html" insert -- . --.

Signed and Sealed this

Tenth Day of November, 2009

David J. Kappos
*Director of the United States Patent and Trademark Office*